United States Patent [19]

Nash

[11] Patent Number: 4,577,312
[45] Date of Patent: Mar. 18, 1986

[54] ARRANGEMENT FOR WIDEBAND TRANSMISSION VIA A SWITCHED NETWORK

[75] Inventor: Peter D. Nash, Naperville, Ill.

[73] Assignee: AT&T Bell Laboratories, Murray Hill, N.J.

[21] Appl. No.: 627,898

[22] Filed: Jul. 5, 1984

[51] Int. Cl.[4] ............................. H04J 3/16; H04J 3/22
[52] U.S. Cl. ........................................ 370/84; 370/79; 370/118
[58] Field of Search ........................ 370/79, 84, 17, 13, 370/95, 118

[56] References Cited

U.S. PATENT DOCUMENTS 4,383,316  5/1983  Seidel .................................. 370/118

Primary Examiner—Douglas W. Olms
Assistant Examiner—Wellington Chin
Attorney, Agent, or Firm—Charles H. Davis; Richard J. Godlewski

[57] ABSTRACT

A plurality of narrow-band channels are established via a switched network between end terminals to provide a wideband facility. Wideband messages are divided into a plurality of narrow-band signals each of which is transmitted over a corresponding narrow-band channel. A data recovery unit connected to one of the network switching offices measures the relative delay between channels and inserts a compensating delay so that the portions of a wideband message transmitted in the same time frame from one end terminal arrive at the other end terminal in a single time frame.

8 Claims, 21 Drawing Figures

FIG. 4

CALL REGISTER

| CALLING TERM. ADDRESS | CLASS OF SVC. | | | | | | | | | |
|---|---|---|---|---|---|---|---|---|---|---|
| CALLED TERM. ADDRESS | FC | SET UP DELAY/DATA MODE | | | | | | | | |
| | CHANNELS ASSIGNED | | | | | | | | | |
| | 0 | 1 | 2 | 3 | 4 | 5 | 6 | 7 | 8 | 9 |
| | | | | | | | | | | |
| CALLING PORT ID | | | | | | | | | | |
| CALLED PORT ID | | | | | | | | | | |
| | | | | | | | | | | |
| ⋮ | ⋮ | ⋮ | ⋮ | ⋮ | ⋮ | ⋮ | ⋮ | ⋮ | ⋮ | ⋮ |
| | | | | | | | | | | |

FIG. 6

OFFSET TABLE

| FC | ADR. REG. | CHANNELS | | | | | | | | | |
|---|---|---|---|---|---|---|---|---|---|---|---|
| NO. OF CHANNEL REG. | | 0 | 1 | 2 | 3 | 4 | 5 | 6 | 7 | 8 | 9 |
| CALLING PORT ID | | | | | | | | | | | |
| CALLING PORT OFFSET | | 0 | 1 | 2 | 1 | 2 | | | | | |
| CALLED PORT ID | | | | | | | | | | | |
| CALLED PORT OFFSET | | 2 | 1 | 0 | 1 | 2 | | | | | |
| TOTAL OFFSET | | 2 | 2 | 2 | 2 | 4 | | | | | |
| INSERTED OFFSET | | 0 | 0 | 0 | 0 | 2 | | | | | |

FIG 5
DATA STORAGE ARRAY
(SET UP DELAY MODE)

FIG. 5A

| CH | FRAME COUNT |   |   |   |   |   |
|----|---|---|---|---|---|---|
|    | 1 |   |   |   |   |   |
| 0  |   |   |   |   |   |   |
| 1  |   |   |   |   |   |   |
| 2  | 1 |   |   |   |   |   |
| 3  |   |   |   |   |   |   |
| 4  | 1 |   |   |   |   |   |
| ...|   |   |   |   |   |   |
| 9  |   |   |   |   |   |   |

INSERTED OFFSET: 0 1 2 3 4 5

FIG. 5B

| CH | FRAME COUNT |   |   |   |   |   |
|----|---|---|---|---|---|---|
|    | 2 | 1 |   |   |   |   |
| 0  |   |   |   |   |   |   |
| 1  |   |   |   |   |   |   |
| 2  | 2 | 1 |   |   |   |   |
| 3  |   |   |   |   |   |   |
| 4  | 2 | 1 |   |   |   |   |
| ...|   |   |   |   |   |   |
| 9  |   |   |   |   |   |   |

INSERTED OFFSET: 0 1 2 3 4 5

FIG. 5C

| CH | FRAME COUNT |   |   |   |   |   |
|----|---|---|---|---|---|---|
|    | 3 | 2 | 1 |   |   |   |
| 0  |   |   |   |   |   |   |
| 1  | 1 |   |   |   |   |   |
| 2  | 3 | 2 | 1 |   |   |   |
| 3  | 1 |   |   |   |   |   |
| 4  | 3 | 2 | 1 |   |   |   |
| ...|   |   |   |   |   |   |
| 9  |   |   |   |   |   |   |

INSERTED OFFSET: 0 1 2 3 4 5

FIG. 5D

| CH | FRAME COUNT |   |   |   |   |   |
|----|---|---|---|---|---|---|
|    | 4 | 3 | 2 | 1 |   |   |
| 0  |   |   |   |   |   |   |
| 1  | 2 | 1 |   |   |   |   |
| 2  | 4 | 3 | 2 | 1 |   |   |
| 3  | 2 | 1 |   |   |   |   |
| 4  | 4 | 3 | 2 | 1 |   |   |
| ...|   |   |   |   |   |   |
| 9  |   |   |   |   |   |   |

INSERTED OFFSET: 0 1 2 3 4 5

FIG. 5E

| CH | FRAME COUNT |   |   |   |   |   |
|----|---|---|---|---|---|---|
|    | 5 | 4 | 3 | 2 | 1 |   |
| 0  | 1 |   |   |   |   |   |
| 1  | 3 | 2 | 1 |   |   |   |
| 2  | 5 | 4 | 3 | 2 | 1 |   |
| 3  | 3 | 2 | 1 |   |   |   |
| 4  | 5 | 4 | 3 | 2 | 1 |   |
| ...|   |   |   |   |   |   |
| 9  |   |   |   |   |   |   |

INSERTED OFFSET: 0 1 2 3 4 5

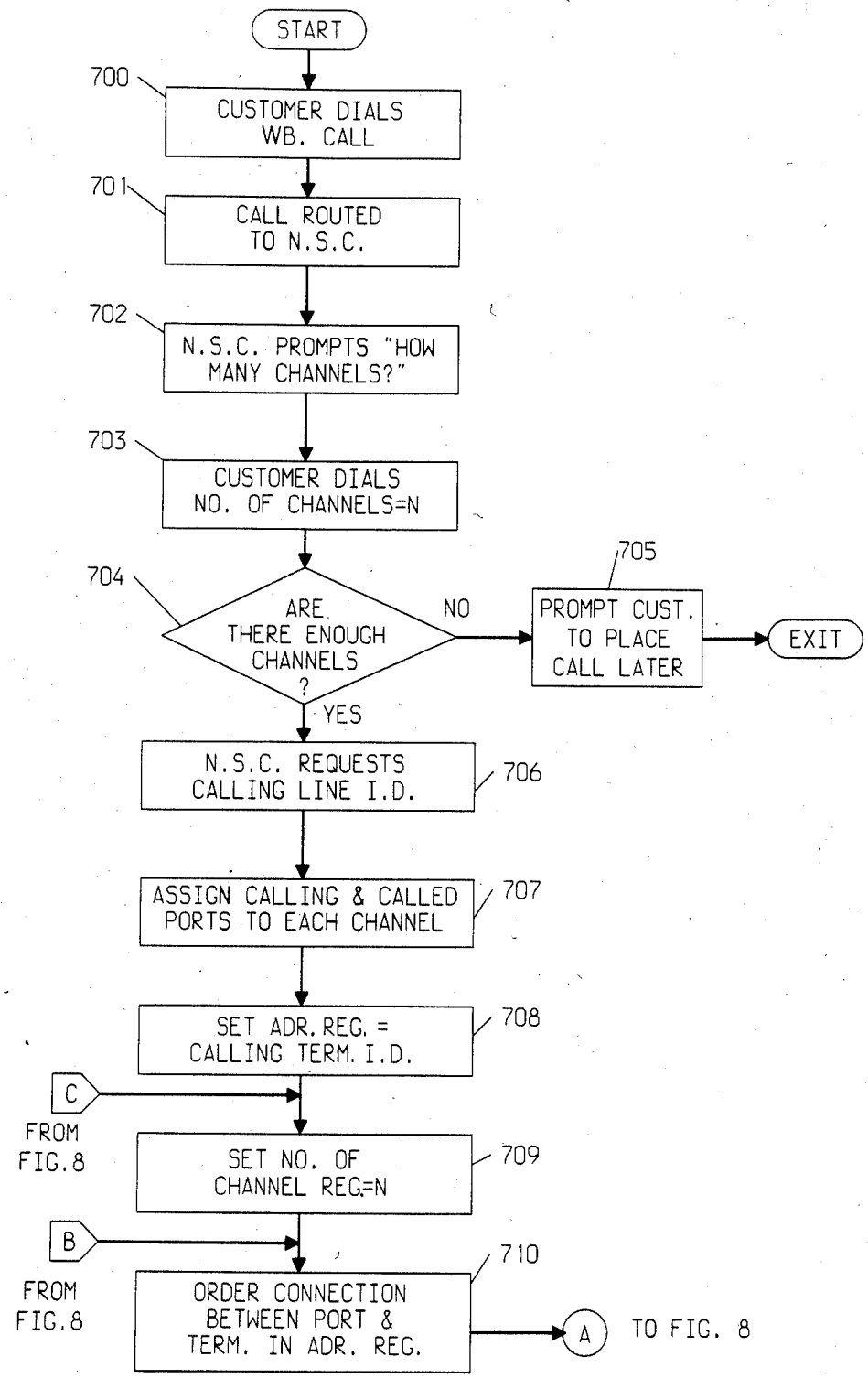

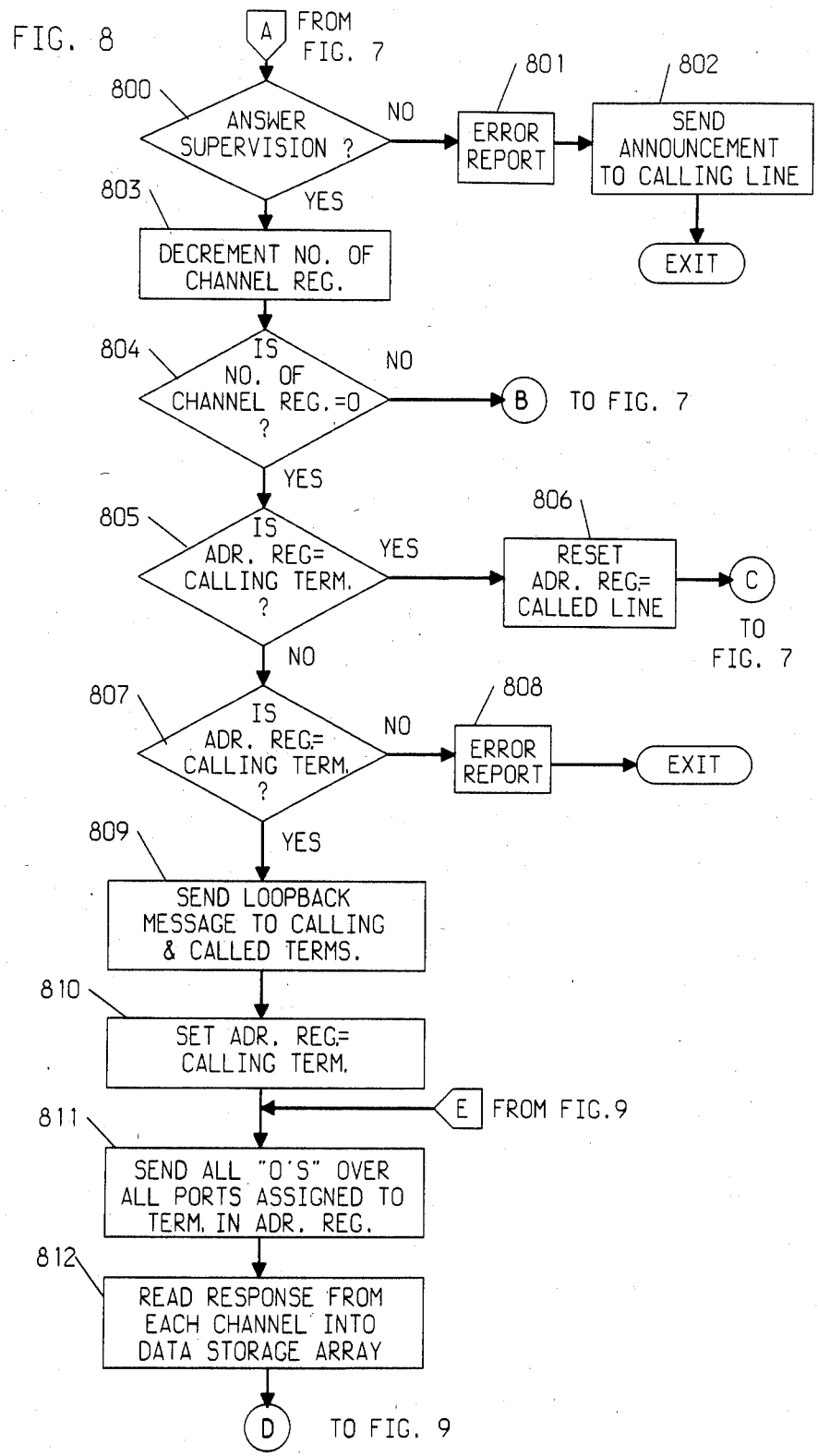

FIG. 11
DATA STORAGE ARRAY (DATA MODE)
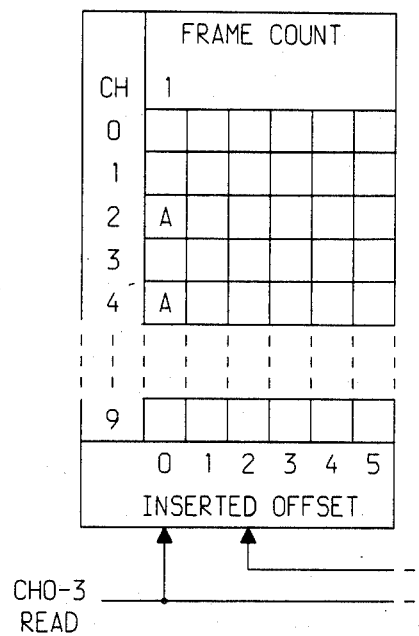
FIG. 11A
TERM 100 → NSC
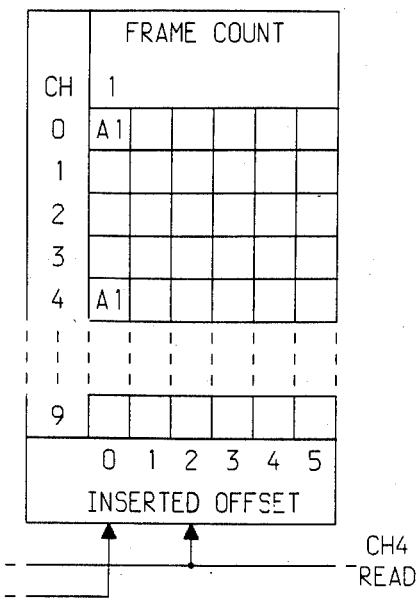
FIG. 11D
TERM 101 → NSC
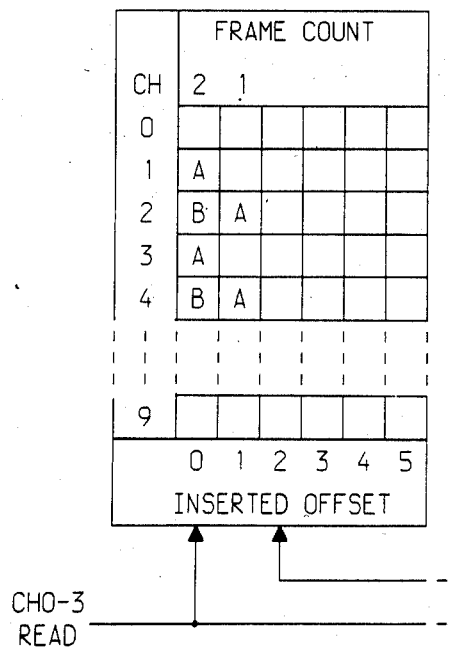
FIG. 11B
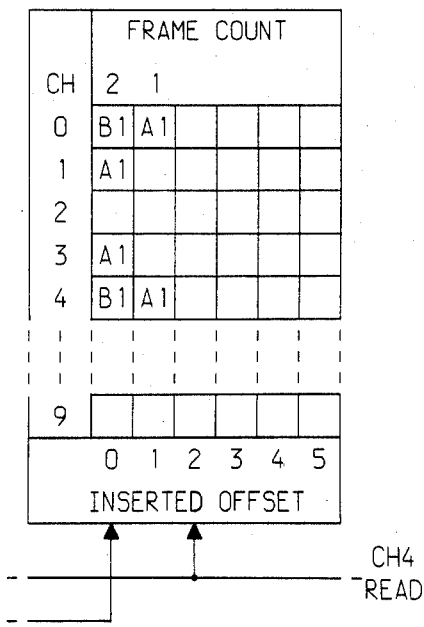
FIG. 11E

| CH | FRAME COUNT | | | | | |
|----|---|---|---|---|---|---|
|    | 3 | 2 | 1 | | | |
| 0  | A |   |   |   |   |   |
| 1  | B | A |   |   |   |   |
| 2  | C | B | A |   |   |   |
| 3  | B | A |   |   |   |   |
| 4  | C | B | A |   |   |   |
| ⋮  |   |   |   |   |   |   |
| 9  |   |   |   |   |   |   |

0 1 2 3 4 5
INSERTED OFFSET

CH0-3 READ

| CH | FRAME COUNT | | | | | |
|----|---|---|---|---|---|---|
|    | 3 | 2 | 1 | | | |
| 0  | C1 | B1 | A1 |   |   |   |
| 1  | B1 | A1 |   |   |   |   |
| 2  | A1 |   |   |   |   |   |
| 3  | B1 | A1 |   |   |   |   |
| 4  | C1 | B1 | A1 |   |   |   |
| ⋮  |   |   |   |   |   |   |
| 9  |   |   |   |   |   |   |

0 1 2 3 4 5
INSERTED OFFSET

CH4 READ

ARRANGEMENT FOR WIDEBAND TRANSMISSION VIA A SWITCHED NETWORK

TECHNICAL FIELD

This invention relates to communication systems and particularly to methods and apparatus for providing wideband communication channels between customer terminals via a switched network.

In a more particular aspect, this invention relates to an arrangement for providing wideband communication channels between customer terminals using a plurality of narrow-band communication channels.

In a still more particular aspect, this invention relates to an arrangement for providing wideband communication channels between customer terminals using a plurality of time division multiplexed narrow-band channels and method and apparatus for detecting and correcting for frame delay among the channels.

BACKGROUND OF THE INVENTION

As we enter the information age, there is an increasing need to transmit large quantities of information among a multitude of customer terminals. This information, in the form of digital signals, may represent voice communication, video, facsimile, bulk data transfers, et cetera.

While the existing public telecommunication networks can offer access to a vast majority of the customer terminals requiring wideband service, most telecommunication networks are limited to a relatively low bandwidth. Typically, access to the network is over a 4 KHz analog line, and one can expect transmission rate of less than 64 Kb/sec. for digital communication within the switched network due to the constraints imposed by existing switching and transmission facilities.

In those specific applications requiring greater bandwidth, private line facilities can be provided between selected customer terminals. These private line wideband facilities, however, are costly, and since they only serve a few terminals, they are frequently idle and not fully utilized.

Accordingly, a need exists in the prior art for extending the wideband capability to a greater number of terminals on a shared network basis.

SUMMARY OF THE INVENTION

The foregoing and other problems are solved and a technical advance is achieved by method and apparatus for combining a plurality of narrow-band switched network facilities into a wideband facility.

More specifically, and in accordance with the illustrative embodiment of the invention, several narrow-band channels are independently established between wideband customer terminals. Multiplexing equipment at the terminals demultiplexes the customer's wideband information into several narrow-band signals which are simultaneously transmitted over the narrow-band channels.

Prior to transmitting any customer data, a test signal is sent over the narrow-band channels to detect any time frame misalignment that may occur between the demultiplexed signals. A data recovery unit in the network computes any frame offset and introduces delay in selected ones of the narrow-band channels to recorrelate the data into its original pattern.

DESCRIPTION OF THE DRAWING

FIGS. 4-6 and 11A-F are pictorial representations of portions of memory stores used in the network services complex;

FIGS. 7-10 are flow diagrams which describe the operation of the system; and

FIG. 12 is a pictorial representation of a typical time frame delay that occurs between two wideband terminals.

GENERAL DESCRIPTION

Figure 1:
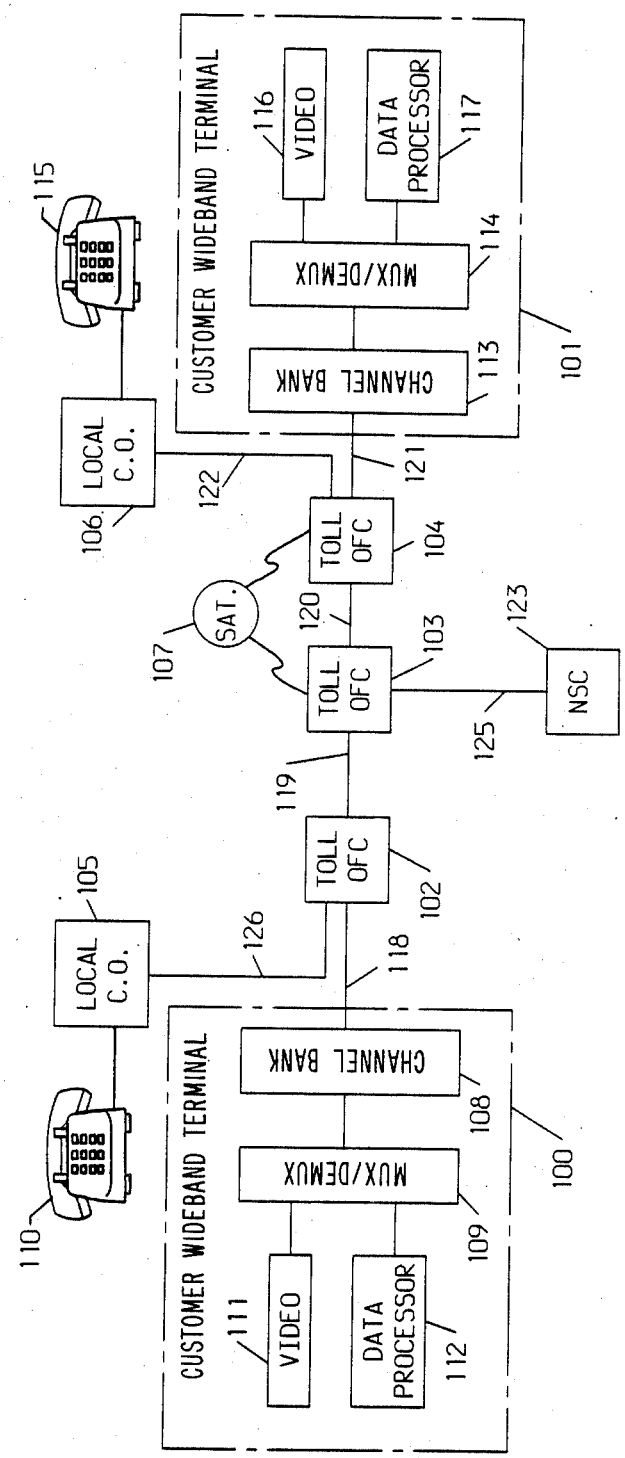
FIG. 1 shows a typical communications network having a plurality of switching offices for interconnecting wideband terminals.

FIG. 1 depicts a typical telecommunications network having a plurality of switching offices 102-106 serving customer wideband terminals 100 and 101 and telephone stations 110 and 115. The switching offices 102-104 are typical time division multiplex toll switching offices such as the electronic switch described in detail in *The Bell System Technical Journal*, Vol. 56, No. 7, September 1977, and need not be fully described herein for the reader to understand the present invention. Local switching offices 105 and 106 can be any type such as the electronic switch disclosed, in part, in U.S. Pat. No. 4,322,843 issued to H. J. Beuscher et al on Mar. 30, 1982.

Customer terminals 100 and 101 require wideband transmission facilities for exchanging many different kinds of information with each other and with other customer terminals served by the network but not shown in FIG. 1. To facilitate this, a terminal such as 100 comprises a channel bank 108, multiplexer/demultiplexer 109, video equipment 111 and data processor 112.

Telephone station 110, which is used to initiate a wideband call, is also provided at the customer premises and is connected to the network via the local central office 105. Station 110 can be a typical station having a keypad for dual tone multifrequency signaling and may have automatic dialing capabilities depending on the particular needs of the customer.

Video equipment 111, which is part of wideband terminal 100, can be any typical television apparatus for transmitting television signals whose output is a wideband digital signal and data processor 112 can be any type of well-known computer which will output large quantities of data in a digital format.

Channel bank 108 is a typical terminal for terminating a digital transmission line such as the well-known T1 carrier system. Among its many functions, channel bank 108 multiplexes 24 relatively narrow-band channels in DS-1 format, into a serial bit stream for transmission via interoffice transmission facilities 118. Similar T1 facilities can interconnect the toll switching offices 102-104.

Interposed between the channel bank 108 and the other customer terminal equipment at wideband terminal 100 is multiplexer/demultiplexer 109. Multiplexer/demultiplexer 109 permits the customer to select various numbers of narrow-band channels from channel bank 108 depending on which terminal equipment is transmitting or receiving wideband data. In addition, multiplexer/demultiplexer 109 converts the wideband signals from video equipment 111 or data processor 112 into a plurality of narrow-band signals and provides a loop-back path for each narrow-band channel. The purpose of this loop-back path will become apparent with the ensuing description.

Associated with one of the toll switching offices is a network services complex 123. The network services complex is a facility using voice announcements for interaction with customers to establish audio and data connections for conferencing and other services. In this illustrative embodiment the network services complex will function to establish a plurality of narrow-band channels to customer terminals and correlate the data exchanged by the terminals to compensate for any delay that may be introduced by the network connections. A complete description of the network services complex can be found in the copending application of D. E. Herr, R. Metz, L. E. Suk, P. R. Wiley, and D. F. Winchell, Ser. No. 382,602, filed May 27, 1982.

In order to establish a wideband communication channel between customer's wideband terminals 100 and 101, the customer at one of the stations, such as station 110, places a telephone call to the network services complex 123. The number dialed by the calling party may include a special prefix indicating that this is a wideband call, followed by the called terminals address and an indication of the number of narrow-band channels required for the call. The customer has a capability of determining the number of channels to be used between his terminal and switching office 102 and this is governed by the type and bandwidth of the information to be transmitted.

The telephone call is routed to the network services complex 123 by a local office 105 and toll switching offices 102 and 103 which are interconnected by the trunk routes 126, 119 and 125.

When the call arrives at network services complex 123 and the network services complex determines that it has sufficient data channel capability, the network services complex requests identification of the calling station 110. Automatic number identification equipment at office 105 forwards the identity of the station of the network services complex.

As will be described in more detail below, the network services complex begins by ordering several data connections to be established from the network services complex to each of the customer wideband terminals 100 and 101. Once the data connections have been established the network services complex orders a loop-back connection to be made at the customers' terminals. This loop-back connection causes the transmit portion of each narrow-band data channel to be connected to its receive portion so that any data sent from the network services complex is returned back to the complex. The loop-back can be established by sending a special code over each data channel or over a common channel to activate a loop-back circuit in a well known manner. In the alternative, the network services complex can alert the called customer and play an announcement to each customer requesting the customers to actuate a loop-back circuit.

It can be seen from the network shown in FIG. 1 that if several narrow-band data channels are established from network services complex 123 to wideband terminals 100 and 101 to form a single wideband facility, the individual channels may take different routes between the network services complex and the customer terminals. In fact, some of the narrow-band channels may be routed via satellite 107 while others may go directly over land facilities 120. As a result of these different routes being used, information on certain channels may be delayed with respect to information sent in the same time frame over other channels.

To compensate for this, network services complex 123 measures the delay in each channel and inserts the necessary delay in some of the channels so that all information transmitted over a plurality of narrow-band channels from one terminal during one time frame is received in one time frame for all channels at the receiving terminal.

Network services complex 123 accomplishes this by first transmitting a test pattern towards each terminal and receiving the test pattern via the loop-back at the customer's terminal. A comparison is made between all time slots in a frame to ascertain if any time slot is receiving information that was sent in an earlier frame. If so, the other time slots are delayed a number of frames by the network services complex to correlate all frames. Of course, since the network services complex is measuring delay in both directions it compensates at the network services complex for any delay experienced over the entire path between two end terminals.

Once the delay has been calculated and the necessary compensation made, the network services complex can inform both terminals to switch to their data mode and remove the loop-back circuitry. The customer wideband terminals have now been interconnected via a wideband facility which is made up of a plurality of narrow-band channels.

DETAILED DESCRIPTION

Figure 2:
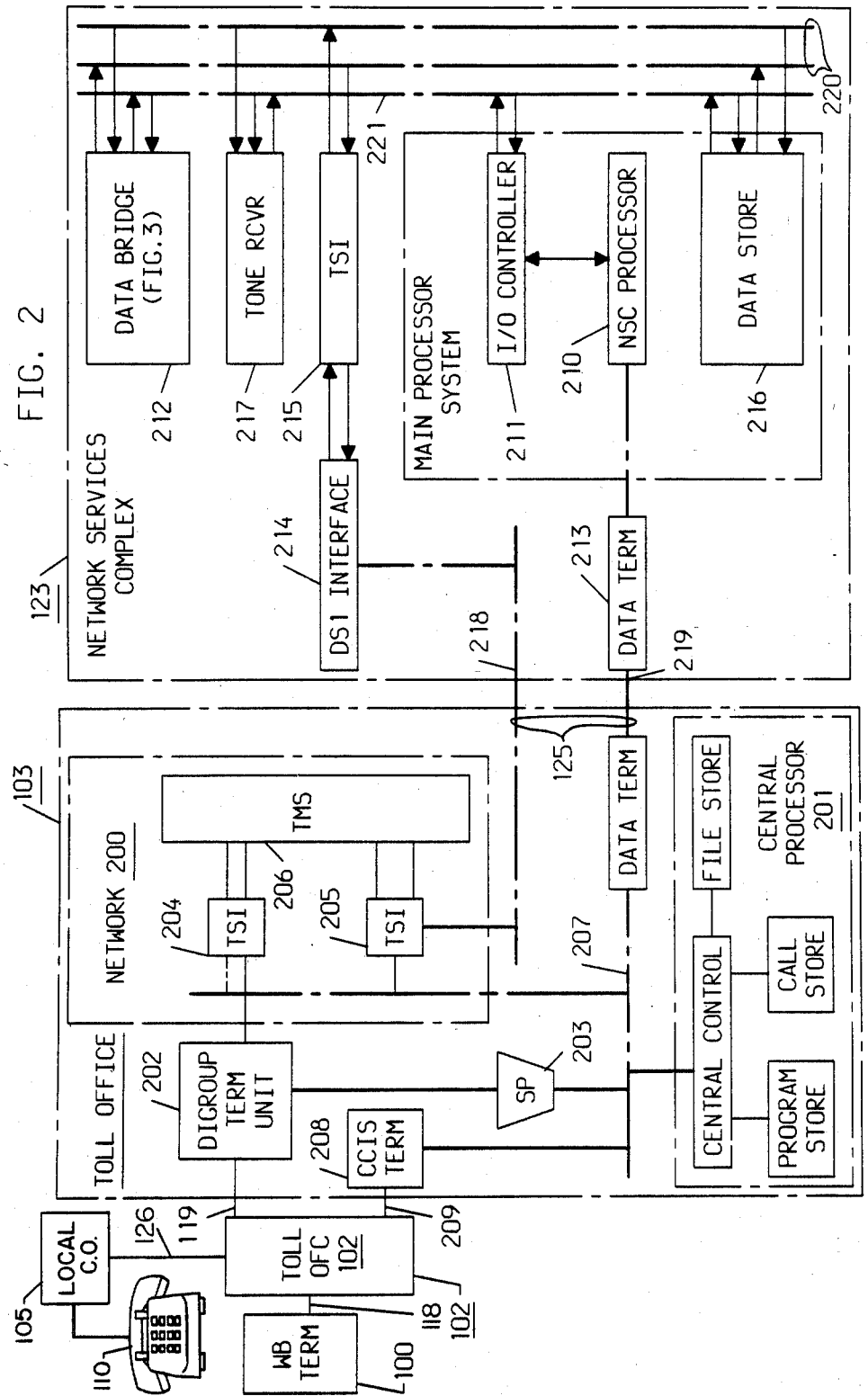
FIG. 2 shows a more detailed block diagram of a toll switching office having a network services complex.

The toll switching system 103 and its associated network services complex are shown in more detail in FIG. 2.

Switching system 103 comprises a network 200, a central processor 201, a digroup terminal unit 202, a signal processor, 203, and miscellaneous equipment units that have not been shown to simplify the drawing.

Network 200 has a time-space-time switching configuration utilizing time slot interchange (TSI) units 204 and 205 and time multiplex switch (TMS) unit 206.

Access to the switching network 200 is via serial pulse code modulation links each accommodating 120 voice channels. Digroup terminal 202 performs the multiplexing and demultiplexing between the interoffice T1 carrier transmission facilities and network 200 and also processes signaling information via signal processor 203.

The majority of the logic, control, storage, and translation functions required for the operation of the toll switching system are performed by central processor 201. A typical processor suitable for use in the illustrative toll switching system is described in the *Bell System Technical Journal*, Vol. 56, No. 2, February 1977.

Central processor 201 is the information processing unit of the system and executes the program instructions resident its program store using call processing data resident in its call store. Central processor 201 communicates with the peripheral units via bus 207.

Interoffice signaling information can be extracted from the transmission paths of trunks by signal processor 203 and used by central processor 201 for call processing. However, the signaling for certain trunks may be transmitted between the offices over a common data link separate from the transmission paths using a common channel interoffice signaling system. A typical common channel interoffice signaling system is described in the *Bell System Technical Journal*, Vol. 57, No. 2, dated February 1978, and is represented herein by CCIS block 208 and data link 209.

Coupled to the toll switching system is the network services complex 123 comprising a main processor system including NSC processor 210 and input/output controller 211, a data bridge system 212, data terminal 213, DS-1 interface 214, time slot interchange 215, data store announcement system 216 and a plurality of tone receivers, such as 217. Network services complex 123 can also include other units such an audio conferencing bridges, speech recognition systems, data processing units, et cetra.

The network services complex functioning as a conference arrangement is disclosed in the copending application of D. E. Herr, et al. as cited above, and the reader is directed to that disclosure for a more detailed description of the network sevices complex. In order to appreciate how the complex 123 is utilized as a data recovery unit in the present embodiment, a brief overview of the complex and its various subsystems will be given herein.

It is intended that network services complex 123 function with many different types of switching systems to provide several special services in addition to those mentioned above. As such, complex 123 has been designed to connect to a switching system via conventional interoffice trunks 218 and a CCIS type data link 219. The interoffice trunks 218 serving complex 123 are digital facilities similar to the T1 trunks between toll offices 102 and 103 as described above and the data link 219 and its terminals are similar to those described in the 1978 *Bell System Technical Journal* cited above. Although these terminals are similar to CCIS type terminals, it is not essential that they be integrated in the CCIS signaling system used for call processing in the network.

The network services complex is modularly designed to allow for various service units to be added. All units are interconnected over a data bus 220 and a control bus 221. The control bus is used by the NSC processor 210 to communicate control, status and error information with the various units in the complex. Data bus 220 consists of a transmit bus and a receive bus and each bus is a 256 time-slot, time-multiplexed PCM data bus.

Interface 214 connects the T1 trunks from toll switching system 103 to time slot interchange unit 215 which, under the direction of processor 210, switches any time slot in the receive T1 bus or the transmit portion of data bus 220 with any time slot on the T1 transmit bus or the receive portion of data bus 220. Thus, the interface 214, time slot interchange 215, and bus 220 provide the path for the exchange of voice, data, announcements and inband signaling between the toll switching system 103 and units of the network services complex.

The network services complex 123 is controlled by NSC processor 210 which performs or initiates all call processing, maintenance, fault recovery, diagnostics and audits for the entire complex. This is accomplished by transmitting orders over control bus 221 to the appropriate peripheral unit. When the order has been executed by the processor in the peripheral unit, a reply is sent back to processor 210 informing processor 210 of what action was taken. Processor 210 also interfaces with terminal 213 to transmit and receive messages from the host toll switching system 103.

As mentioned above, the network services complex can be equipped to furnish many services. For purposes of this illustrative embodiment, the network services complex functions as a data recovery unit in that it inserts the necessary delay in selected channels to compensate for delay encountered by other channels traversing the network. The result accomplished is that all portions of a wideband message transmitted simultaneously via a plurality of narrow-band channels arrive in the same time frame at the receiving data terminal.

Accordingly, the complex comprises data bridge system 212, which receives data from each data terminal, buffers the data, calculates any frame offset and distributes the data to the other terminal in the proper frame. The term "data", when used with respect to information transmitted by a customer, is meant to include digital representations of video signals, facsimile, signals from devices such as electronic chalk boards, et cetera, which are separate from the voice and tone signals transmitted by the customer.

Network services complex 123 also includes a data store system 216 for furnishing tones and announcements to instruct the customers in the use of the wideband services, and a tone receiver 217 which receives the tone signals representing digits generated by the customer in establishing and controlling the wideband connection.

The control interface between the network services complex systems and the toll switching system 103 is via a main processor system including NSC processor 210, input/output controller 211, and terminal 213. It is via this path that orders are exchanged between the network services complex and the toll switching system.

DS-1 interface 214 in this embodiment provides an interface for up to five T1 trunks (120 channels or time slots) which terminate on time slot interchange unit 215. The time slot interchange unit, in turn, functions to switch these circuits with 256 time slots on time multiplex data bus 220 to interconnect the channels with the various service units in the network services complex. Thus, voice, data, and signaling information incoming over the toll telephone network from a customer is forwarded via interface 214, and time slot interchange 215 to the data bridge for buffering or to the tone receiver for digit detection and collection while announcements and tones from data store system 216 and buffered data from the bridge are transmitted back via the time slot interchange over the toll network to the customer.

Figure 3:
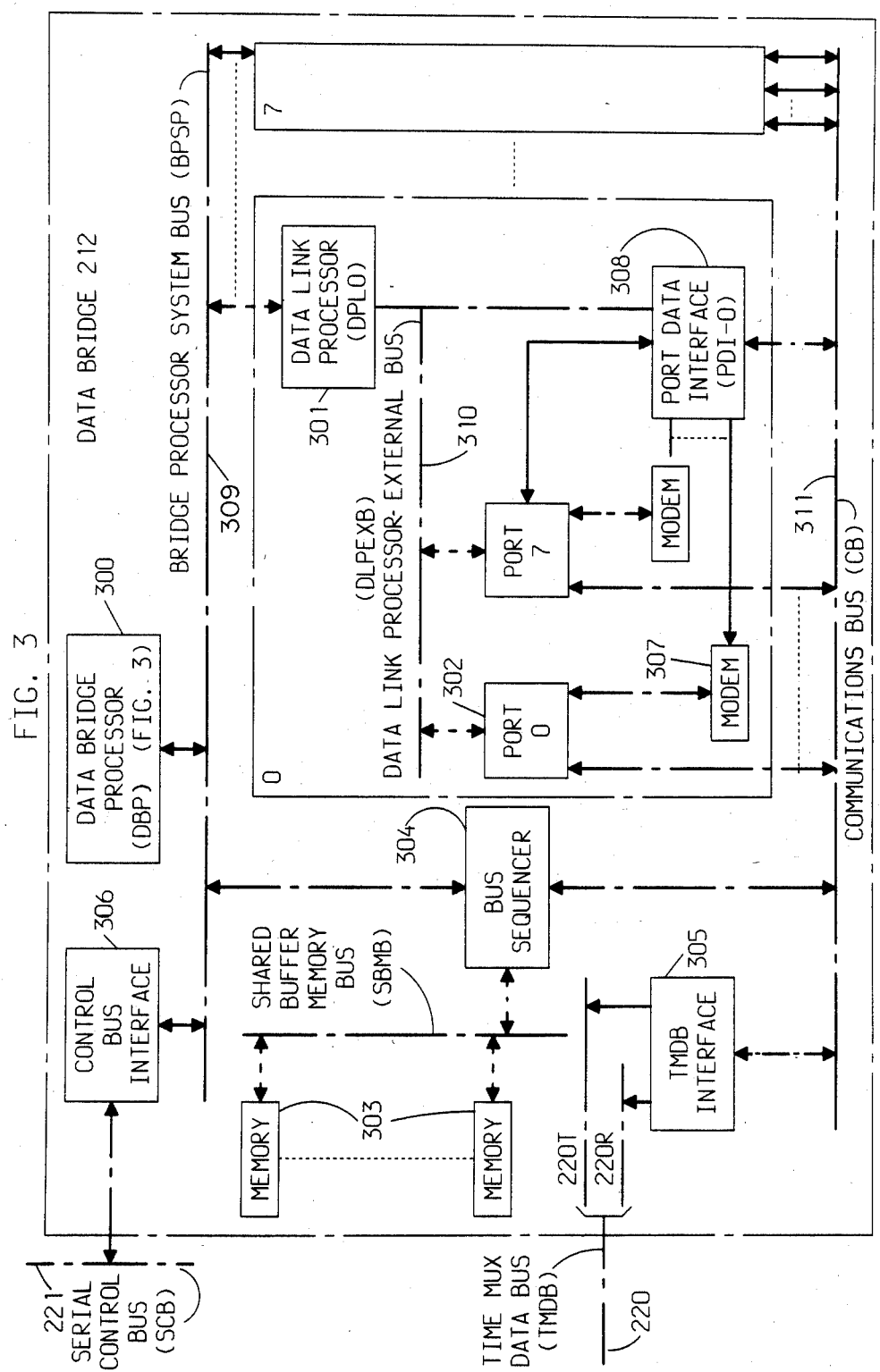
FIG. 3 is a block diagram of the data bridge portion of the network services complex.
Figure 9:
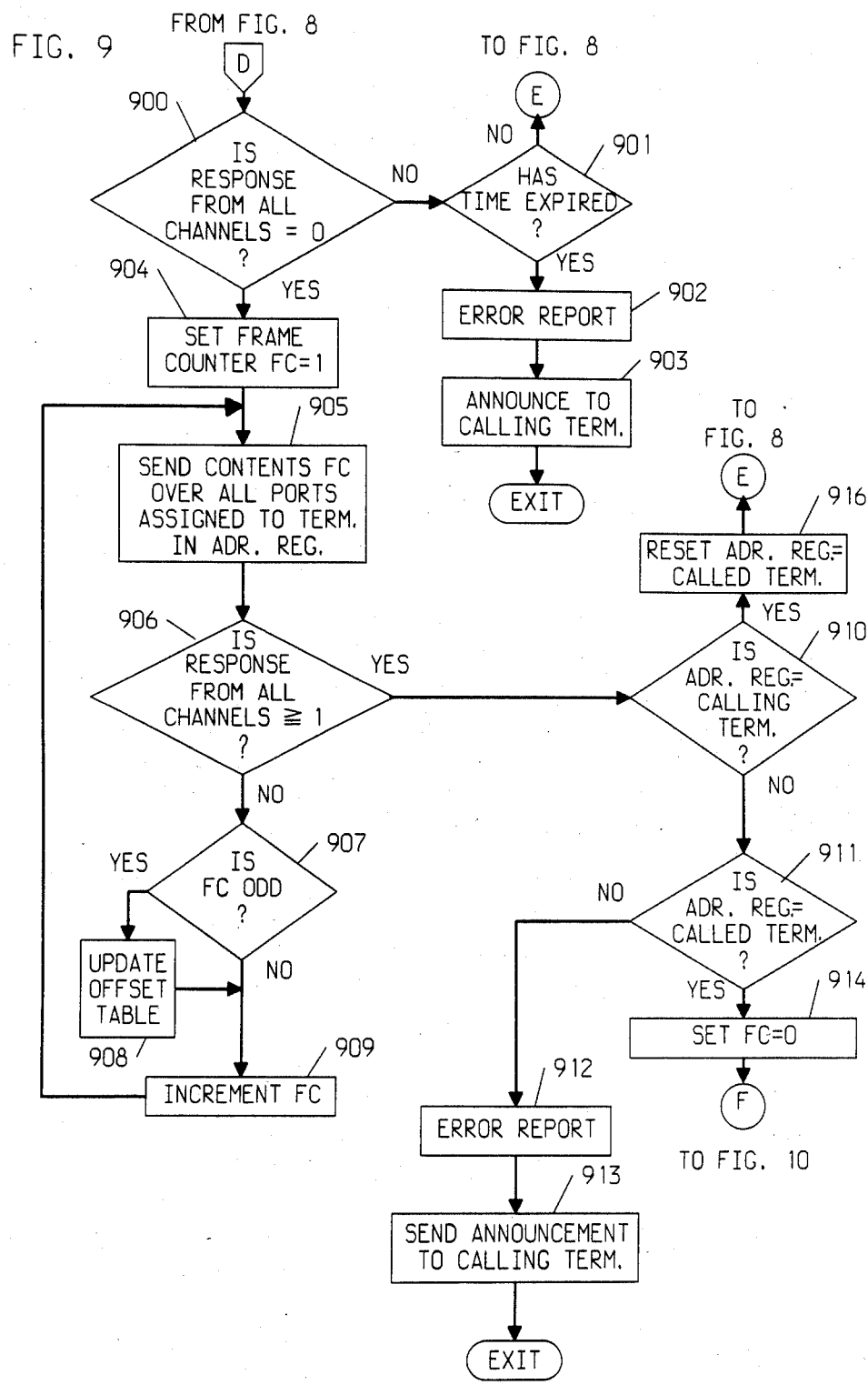
Figure 10:
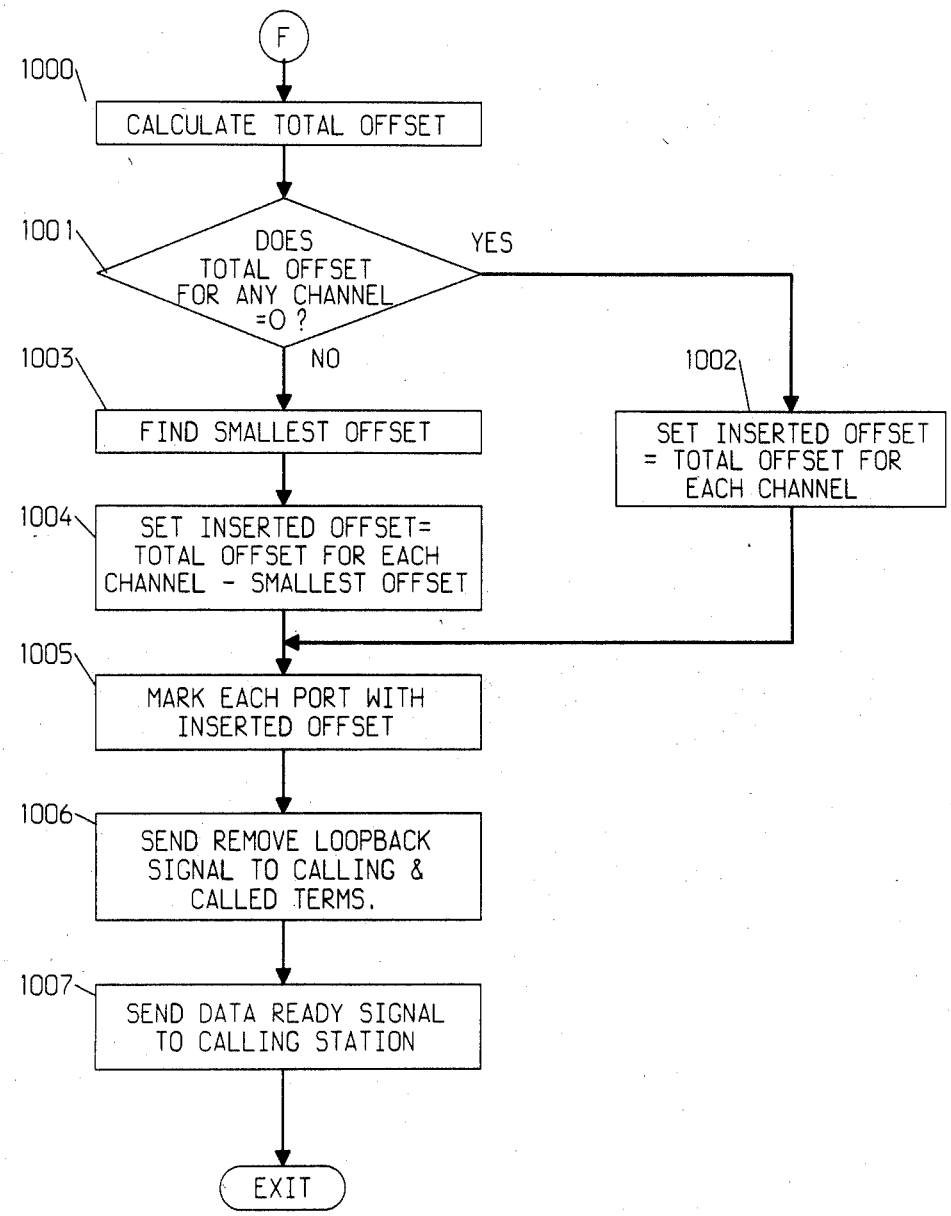

The apparatus of the data bridge is more fully disclosed in FIG. 3. As shown in FIG. 3, data bridge 212 comprises data bridge processor 300, a plurality of data link processors, such as 301, a shared buffer memory 303 and a bus sequencer 304. Associated with each data link processor is a port data interface, such as 308 and a plurality of ports, such as 302. In this illustrative embodiment, eight data link processors are provided in the data bridge and each data link processor is equipped to serve eight ports for a total of 64 ports per data bridge.

The data bridge interfaces with the network services complex via two buses, namely, the serial control bus 221 which handles the control functions and the time multiplex data bus 220 which handles the data functions.

The data bridge processor 300 is the main control processor for the data bridge. It interfaces with NSC processor 210 via serial control bus 221 from which it receives wideband call configuration information and to which it reports call status. Data bridge processor 300 is connected to the shared buffer memory 303 via the bridge processor system bus 309 and bus sequencer 304. It is from the shared buffer memory 303 that the data bridge processor 300 obtains session and document protocol data. Data bridge processor 300 can also access the various data link processors via bus 309 to control port configuration and monitor the port status.

Each data link processor interfaces with eight high-level data link control ports, such as port 302, to control the port configuration as commanded by data bridge processor 300. The data link processors also handle all link-level protocol procedures except synchronization, cyclic redundancy checking and bit insertion.

The ports, such as port 302, handle actual frame transmission and reception. The ports interface with a port data interface such as 308 from which they receive 56 Kb/sec serial data and they interface with a modem such as modem 307 from which they receive 4.8 Kb/sec serial data. Modem 307 is used with certain data conferences as set forth in the above-cited D. E. Herr et al. application and will not be described in detail herein. The ports can also interface directly with the shared buffer memory on a time-shared basis via communications bus 311 to read out of the memory information to be transmitted over the network to a data terminal or write into the memory data received from a data terminal as directed by the associated data link processor.

The port data interface 308 functions with eight port units, such as port 302. Port data interface 308 receives data from and transmits data to the network services complex time-slot interchange frame 215 (FIG. 2) via the time multiplexed data bus 220 and communication bus 311 at a 64 Kb/sec rate compatible with the standard T1 trunks at the toll switching center 103.

Thus, the data stored in the shared buffer memory after being processed by the port data interface and the port can then be extracted from the shared buffer memory by any port for transmittal to the receiving terminal during any time frame. The data bridge system is disclosed in more detail in the above-cited D. E. Herr et al. application and in the copending application D. E. Herr, L. A. Russell, and R. Metz, Ser. No. 415,254 filed Sept. 7, 1982.

To illustrate the operation of the overall arrangement as set forth in the flow diagram of FIGS. 7–10 let it be assumed that the customer at terminal 100 in FIG. 1 wishes to establish a wideband facility to the customer terminal 101 and that the bandwidth necessary to satisfy the customer's needs can be provided by combining the bandwidth capabilities of five T1 channels.

The customer at terminal 100 utilizes his telephone station 110 and dials the directory number of station 115. This number is prefixed by a special three digit code indicating that the customer wishes to establish a wideband facility.

The call is routed, via the telephone network in a conventional manner, to a toll switching office having a network services complex such as toll office 103 shown in FIG. 2. Toll office 103 selects an idle trunk in the T1 link 218 and sends an initial address message to the NSC over data link 219 thereby indicating that wideband services are required.

In response to the initial address message, NSC processor 210 connects the calling customer station with a spare channel via time slot interchange 215 to data store 216 and an announcement prompt, as set forth in box 702 (FIG. 7), is played to the calling customer. The prompt informs the calling customer that he/she has been connected to a wideband service facility and requests the customer to dial the quantity of narrow-band channels that the customer wishes to use for this call. The processor 210 also orders a tone receiver 217 to be connected to the calling line in order to receive the control signals from the calling station set 110.

When the customer indicates the number of channels required (box 703), NSC processor 210 examines its memory to ascertain if sufficient resources are available as shown in box 704. When resources are not available, box 705 is executed and an announcement is played to the calling customer requesting the customer to place the call at a later time.

If sufficient resources are available the network services complex requests the calling line identification from the calling office over data link 219. Processor 210 then establishes a CALL REGISTER in its call store for keeping track of the progress of this call.

A pictorial representation of a portion of a typical CALL REGISTER is shown in FIG. 4. The register contains many entries including the calling and called terminal addresses, a class of service, and the mode of operation the call is in at any given time. Insofar as this description is concerned, the call will be in either the "set up delay" mode during which the amount of the delay to be introduced into each channel will be calculated or the call will be in the "data" mode during which customers will be exchanging data over the wideband facility.

The CALL REGISTER also includes memory locations for the identity of the narrow-band channels to be used on the call including the particular data bridge ports that are assigned to the channels.

In addition to the CALL REGISTER, processor 210 orders data bridge processor 300 to establish an OFFSET TABLE for this call. The OFFSET TABLE is established in the shared buffer memory 303 so all ports will have access to the memory when in their data mode. The OFFSET TABLE contains memory cells for entering the amount of delay, or off-set, experienced by each channel and the amount of delay that has to be introduced into a channel to realign the data into its original format. A NUMBER-OF-CHANNELS REGISTER, an ADDRESS REGISTER and a FRAME COUNTER are also resident in the OFFSET TABLE and the functions of these will become apparent from the ensuing description.

Returning to the description of the operation of this system with respect to the flowchart of FIG. 7, processor 210 executes the operations described in box 707 by selecting port circuits from its lists of idle circuits and assigning two port circuits to each channel. One port circuit will be used for communication with the calling wideband terminal and the other port circuit will be used for communication with the called wideband terminal. Processor 210 also orders the data bridge processor (box 708) to set the ADDRESS REGISTER in the OFFSET TABLE to indicate the calling line identification since the T1 channels will be established first to the calling channel.

Processor 300 also sets (box 709) the NUMBER-OF-CHANNELS CHANNELS REGISTER to five which is the number of T1 channels that the calling customer has requested for this wideband call.

Having allocated the resources and prepared the appropriate registers in memory, processor 210 sends requests (box 710) over its data link to the host toll office 103 requesting that network connections be established between each port and the calling wideband terminal.

These connections can be established by forwarding a call to an address associated with wideband terminal 100 similar to dialing a directory number associated with a telephone station. Toll office 102 would be programmed with a trunk hunting feature to select the first five T1 channels in the route 118 serving wideband terminal 100 in a manner similar to the well known PBX and trunk hunting techniques.

As each narrow-band channel is selected, there is an exchange of supervisory signals between the port of the data bridge and the customer data terminal in accordance with standard protocol procedures. If the exchange of supervisory signals is proper, the data bridge processor 300 informs the NSC processor 210 that answer supervision has been received and the NUMBER-OF-CHANNELS REGISTER is decremented (boxes 800 and 803). Processor 210 can now order the establishment of another T1 channel.

Should answer supervision not be received on any channel the "no" branch of box 800 is executed and a system error report is generated (box 801). Along with the error report, an announcement is played to calling station 110 informing the customer thereof of the equipment trouble in the customer's terminal or the T1 channels serving his terminal.

Assuming that answer supervision has been received over the first channel, processor 210 continues ordering the establishment of additional T1 channels between the port circuits of data bridge 212 and the calling wideband terminal 100 until the NUMBER-OF-CHANNELS register has been decremented to zero indicating that all five channels have been established. The ADDRESS REGISTER is now reset to the address of the called terminal (boxes 804 and 805) and five T1 channels are ordered up between the called ports of data bridge 212 and the wideband terminal 101 associated with the called station 115.

Having established five narrow-band channels to the calling and called terminals, processor 210 now causes a loop-back message to be sent to the customer terminals and sets the ADDRESS REGISTER to the calling terminal address in preparation for measuring the delay in the T1 channels.

As noted above, each channel is put in a loop-back mode by connecting its transmit and receive paths together at the customer terminal end so that data transmitted by the data bridge can be returned to the data bridge for evaluation. The loop-back can be accomplished in many ways. For example, the network services complex could request the calling customer at station 110 to actuate the loop-back circuitry in wideband terminal 100 by sending an announcement from data store 216 or the data bridge processor could send a message over one of the T1 channels or over a control channel to automatically actuate loop-back circuitry at the wideband terminal.

In any event, once the loop-back circuitry has been actuated, the data bridge processor executes box 811 and begins sending all zeros over all T1 channels simultaneously, to the calling wideband terminal 100. These messages traverse the network from toll office 103 via toll office 102 to channel bank 108 and back over the network to the data bridge in network services complex 123 where they are stored in a DATA STORAGE ARRAY.

The DATA STORAGE ARRAY is a portion of the shared buffer memory 303 (FIG. 3) and is pictorially represented in FIGS. 5 and 11. Two DATA STORAGE ARRAYS are provided for each call. Each array collects and buffers the data in one direction of a two-way data channel between the called and calling customers.

While many arrangements are suitable for use with the invention, in this embodiment the DATA STORAGE ARRAY can be thought of as a plurality of shift registers, one being associated with each narrow-band channel assigned to the wideband call. Each so-called shift register has sufficient positions into which data can be shifted, equal in number to maximum amount of delay expected in the network. The maximum network delay is predictable since most networks are routing techniques which limit the number of links that can be serially connected between customer stations.

When the data bridge processor orders all ports to simultaneously send all zeros toward the calling wideband terminal 100, it writes the responses it receives in the array associated with the calling terminal. Processor 300 then continually monitors the left-most column of the array until all zeros are detected on all channels. If all zeros are not present on all channels within a prescribed interval an error report is made and the calling customer is informed of the trouble in establishing the wideband facility (boxes 901–903).

When all ports are receiving all zeros, indicating that a successful loop-back condition has been established in each channel, data bridge processor 300 sets the FRAME COUNTER register to "one" and sends the digit "one" simultaneously over all channels to the calling terminal as shown in boxes 904 and 905.

In order to illustrate how the network services complex recognizes and compensates for certain narrow-band channels which introduce delays with respect to other channels, let it be assumed that when the channels 0 through 4 have been established between wideband terminal 100 and the data bridge, channels numbered 0, 1 and 3 delay transmission with respect to some or all of the channels. The result is that data simultaneously transmitted over all channels during one time frame will not arrive at its destination in the same time frame for all channels. More specifically, let it be assumed that channels 2 and 4 do not introduce any frame delay in transmission, but that any data sent over channels 1 and 3 will be delayed one time frame in each direction to and from the terminal with respect to channels 2 and 4. Thus, any data sent from the data bridge in one time frame and returned via the loop-back in channels 1 and 3 will be received at the data bridge two time frames later than the data sent over channels 2 and 4. Additionally, let it be assumed that channel 0 delays the information simultaneously transmitted over all channels two time frames in each direction resulting in an overall delay via the loop-back of four time frames with respect to channels 2 and 4.

It will be recalled from the above description that the data bridge processor causes the digit 1 to be sent in the first time frame over each of the channels numbered 0 through 4. The results received in the first frame via the loop-back will be entered in the data storage array which is pictorially shown in FIG. 5A.

As shown in box 906, processor 300 examines the left-most column of the array for all 1's or a larger digit to ascertain if all channels have at least returned the first digit of the test pattern. Since only channels 2 and 4 have a 1 in the left-most column during the first time frame the other channels have delayed their response by at least one time frame. Processor 300 now updates the OFFSET TABLE (FIG. 6) and increments the FRAME COUNTER in preparation for sending the digit 2 over all channels.

The OFFSET TABLE is updated by incrementing the contents of the port offset cells for channels 2 and 4 associated with the calling wideband terminal since these channels will have to delay their transmission by at least one frame to realign their data with data simultaneously transmitted over the other channels.

All of the ports are now ordered (box 905) to simultaneously transmit the contents of the FRAME COUNTER to their respective data terminals during the second time frame. The responses received are put into the DATA STORAGE ARRAY shifting the prior contents one position to the right.

After the reception of the data transmitted during the second time frame the DATA STORAGE ARRAY would contain the information shown in FIG. 5B. It is noted that under the assumption that channels 1 and 3 introduce a 1 time frame delay in each direction, the digit 1 will still not have arrived back at the data bridge. On the other hand the digit 2 is detected on channels 1 and 4 which have not introduced any delay in the transmission. Since the FRAME COUNTER is even, the "no" branch of box 907 is executed to increment the frame counter in preparation for transmitting the digit 3 during the third time frame.

When the digit 3 is received via the loop-back at wideband terminal 100 and entered into the DATA STORAGE ARRAY, the DATA STORAGE ARRAY would contain the information as depicted in FIG. 5C. It should be noted that channels 1 and 3 now have received digit 1 which was transmitted by the data bridge in time frame 1 thus indicating a delay of two time frames (one in each direction) on channels 1 and 3.

In executing box 906, processor 300 examines the left-most column of the DATA STORAGE ARRAY and ascertains that not all channels have received the digit 1 that was originally transmitted during time frame 1. Accordingly, since the time frame is odd, the OFFSET TABLE is updated by incrementing the calling port offset memory cells (FIG. 6) for all calling ports except channel 0 which has not yet received the digit 1.

Processor 300 continues to execute the operations depicted in boxes 905-909 until the response from all channels is equal to or greater than the digit 1. This indicates to the processor that all channels have returned the information sent out in the first time frame and the calling port offset memory cells for channels 0-4 contain the amount of delay necessary to be inserted in each channel to realign the data into the same frame across the wideband facility.

Processor 300 now resets the ADDRESS REGISTER to the called terminal identity (box 916) and executes the same procedure for the five channels serving the called terminal that was executed with respect to the channels serving the calling terminal as described above. More specifically, the data bridge first sends all zeros over channels 0-4 to the called terminal. When zeros are being received at the data bridge via the loop-back at the called terminal, the data bridge sends a test pattern by simultaneously transmitting a series of digits 1, 2, 3, et cetera over the channels and calculating the delay that different channels introduce by examining the digits when they are received back at the data bridge.

Let it be assumed that when the delay is ascertained for the channels serving the called wideband terminal 101 that channels 0 and 4 caused no delay, channels 1 and 3 caused a one frame delay in each direction and channel 2 introduced a two frame delay in each direction. Consequently, in order to realign channels 0, 1, 3 and 4 with channel 2 between network services complex 123 and the called wideband terminal 101, a two frame delay would have to be inserted in channels 0 and 4 and the one frame delay would have to be inserted in channels 1 and 3.

Data bridge processor 300 has now ascertained the amount of delay necessary to realign the channels in each direction between the network services complex and the calling and called terminals and has entered this information in the OFFSET TABLE depicted in FIG. 6. Processor 300 now executes box 1000 (FIG. 10) summing the calling and called port offsets to find the total offset. The processor also examines the total offset for each channel (box 1001) to ascertain if there are any channels which do not require the insertion of delay.

It should be appreciated from the above description that the calling port offset and called port offset represent the amount of the delay that has to be inserted in each channel to realign the data transmitted between the end terminals and the data bridge. In reality however, the data does not have to be realigned at this intermediate point in the connection, i.e., at network services complex 123. The only requirement is that all segments of a data message which are transmitted from one terminal simultaneously over several narrow-band channels arrive at the other terminal in the same time frame for all channels. Consequently, when the total offset for each channel is calculated according to the illustrative example, the results show that every channel does not require the insertion of some delay as shown in FIG. 6.

At this point processor 300 finds the channel with the smallest total delay (box 1003) and subtracts this offset from all channels to determine the inserted offset as shown in box 1004. The result is that no additional delay need be inserted in channels 0 through 3, but the data transmitted via channel 4 will require a two frame delay to realign it with the other channels. The inserted offset is then marked in the memory of the ports associated with each channel as set forth in box 1005.

Data bridge processor 300 now informs the network services complex processor 210 that the ports have been marked with proper offset and the network services complex processor causes a message to be sent to the calling and called terminals to have the loop-back removed. A message is also sent to the calling customer station indicating that the wideband channel has been established and the customers can begin exchanging data.

When the wideband facility comprising the five narrow-band channels is in the data mode the wideband terminal equipment at the customers' premises demultiplexes the wideband signal into five narrow-band signals which are transmitted simultaneously over the narrow-band channels 0-4. The port receiving its corresponding channel's data at the data bridge writes this information into the DATA STORAGE ARRAY resident in a shared buffer memory 303 where the data is stored until it is readout by one of the port circuits for transmission to a wideband terminal at the other end of the connection. Since the memory in each port circuit now contains the inserted offset that was previously calculated, the port will delay the transmission of a particular segment of the message for the number of time frames indicated by the inserted offset.

This is accomplished in the illustrative embodiment by loading the DATA STORAGE ARRAY (FIG. 11) with the data received over each channel. As each frame of data is received, the data is continuously shifted to the right and new data is loaded into the memory in the left-most position. During a read cycle the port is indexed to a particular column in the memory by the inserted offset.

Figures 11C, 11F, 12:
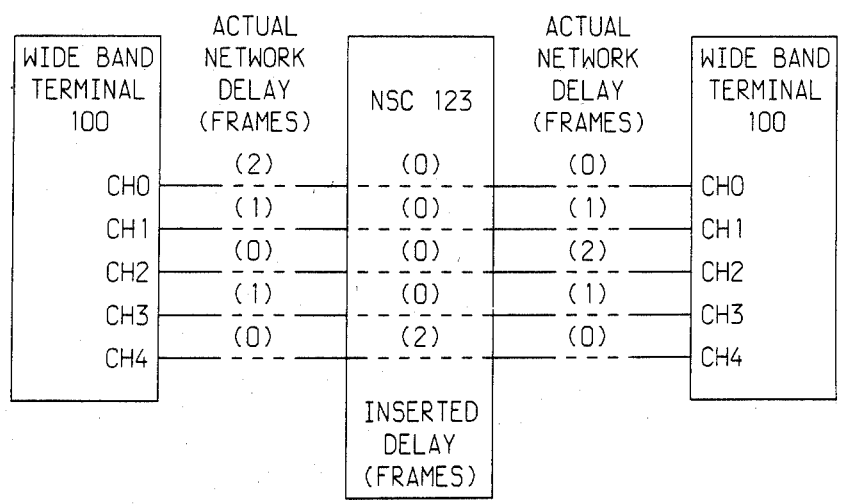

The manner in which data is stored in the DATA STORAGE ARRAY of the shared buffer memory is pictorially represented in FIGS. 11A through 11F with FIGS. 11A, 11B and 11C depicting data being transmitted in the opposite direction from wideband terminal 100 to the network services complex and FIGS. 11D, 11E, and 11F depicting data being transmitted in the opposite direction from wideband terminal 101 from the network services complex. Let it be assumed that terminals 100 and 101 are exchanging wideband data and the successive frames transmitted by terminal 100 contains blocks of data designated A, B, C et cetera. Likewise blocks of data sent in successive frames in the opposite direction from terminal 101 are designated A1, B1, C1, et cetera. Each block of data is divided into five segments by the multiplexing equipment at the wideband terminal and the segments are transmitted simultaneously over five narrow-band channels.

It can be seen from FIG. 11A that during the first time frame the data segments "A" have been delayed by channels 0, 1 and 3 and have arrived at the network services complex only over channels 2 and 4. Those data segments are written in the DATA STORAGE ARRAY by the respective calling ports. When the called ports read the contents from the DATA STORAGE ARRAY during this time frame for transmittal to wideband terminal 101, the ports will read the columns designated by the inserted offset. Thus, in the example being described the called ports associated with channels 0 through 3 will read the first column of the DATA STORAGE ARRAY and the port associated with channel 4 will read the third column as shown in FIG. 11A.

As a result of reading the DATA STORAGE ARRAY using these offsets only the called port associated with channel 2 will transmit the data segment "A".

When the "B" segments of the message are received in the next time frame and written in the DATA STORAGE ARRAY the "A" segments are shifted one place to the right as shown in FIG. 11B. During the read portion of this time frame the port associated with channel 2 will transmit the "B" segment and the ports associated with channels 1 and 3 will transmit the "A" segment.

FIG. 11C represents the DATA STORAGE ARRAY during the third time frame when all five channels have received at least one segment of the data message. When the DATA STORAGE ARRAY is read during this time frame the called ports associated with channels 0 and 4 read the first and third columns respectively and transmit "A" segments. Called ports 1, 2 and 3 read the first column of the DATA STORAGE ARRAY and transmit "B" "C" and "B" segments, respectively. Thus, it can be seen from the above description that insofar as transmission from wideband terminal 100 to the intermediate point in the network, i.e., network services complex 123, only that data being transmitted on channel 4 is delayed two frames in the network services complex.

Data transmission in the first three time frames in the opposite direction, i.e., from wideband terminal 101 to the network services complex, is written into the DATA STORAGE ARRAY as depicted in FIGS. 11D, 11E and 11F by the called port circuits and read out of the DATA STORAGE ARRAY by the calling port circuits using the inserted offset as described above.

The reader's attention is directed to FIG. 12 which summarizes the transmission delay characteristics of the five narrow-band channels that were established between the wideband terminals in accordance with the above description. It can be seen from FIG. 12 while the delay encountered on the individual narrow-band channels may vary from channel to channel between the end terminals and the network services complex due to routing et cetera, the network services complex equalized the delay by offsetting certain of the channels namely, introducing a two frame delay in channel 4.

Consequently, when all segments of a block of data are transmitted simultaneously, i.e., in the same time frame, they arrive at the distant terminal still within a single time frame but at a later time which is determined by the time necessary to traverse the network.

In summary an arrangement has been disclosed for establishing a wideband facility over a network using the combined bandwidth of a plurality of narrow-band channels wherein wideband data is demultiplexed into narrower bands of data each of which is transmitted over one of the narrow-band channels. Method and apparatus are described for assurring that time frame misalignment does not occur between multiplexed signals.

It is to be understood that the arrangements described herein are merely illustrative of the applications of the principles of the invention and that numerous other arrangements may be devised by those skilled in the art without departing from the spirit and scope of the invention.

What is claimed is:

1. For use in a communications network having a plurality of switching offices, customer wideband terminals, and time division multiplex (TDM) channels having a relatively narrow bandwidth for interconnecting said terminals via said offices, a method for establishing to a designated one of said terminals a facility having a wider bandwidth than any one of said TDM channels comprising the steps of:

establishing to said designated terminal a selected plurality of said TDM channels whose combined bandwidth is at least equal to the bandwidth required by said designated terminal, transmitting from one end over each said selected TDM channel a test pattern of data in successive time frames, measuring the relative delay between selected TDM channels by comparing at the other end of said selected channels during a particular time frame the data received on each one of said selected TDM channels with the data received on another one of said selected TDM channels, and selectively inserting delay in the transmission of data over any of said selected TDM channels so that data transmitted in a single time frame from one end over all said selected TDM channels will be received at the other end of all said selected TDM channels in a single time frame.

2. The invention defined in claim 1 wherein the step of measuring delay comprises the step of determining said particular time frame when all of said selected TDM channels have received at least the contents transmitted from said one end in the initial time frame of said successive frames.

3. The invention defined in claim 1 wherein the network comprises a data recovery unit coupled to said channels and including a memory and wherein the step of inserting transmission delay comprises the step of intercepting data transmitted over said selected channels during a first time frame, writing said intercepted data into said memory and reading said intercepted data out of said memory during a subsequent time for retransmittal over said selected channels.

4. The invention defined in claim 1 wherein the step of transmitting said test pattern comprises the step of sending a predetermined sequence of data messages wherein each data message in said sequence is sent over all said selected TDM channels in the same time frame.

5. For use in a communications network having a plurality of customer stations, a plurality of switching offices, a plurality of time-division multiplex channels each having relatively narrow-band transmit and receive paths, and a data recovery unit coupled to one of said offices, apparatus for establishing a transmission facility between wideband terminals at a calling and called one of said stations wherein said facility has a bandwidth greater than the individual ones of said channels, said apparatus comprising:

means at said data recovery unit responsive to a service request from said calling station for connecting a plurality of said channels to the wideband terminals at said calling and called stations, means effective upon the connection of said channels for causing said terminals to interconnect via a loop-back the associated transmit and receive paths, means for transmitting test data from said data recovery unit over the transmit paths associated with each said connected channel, means at said data recovery unit responsive to the receipt of said test data over the receive paths of said connected channels for comparing during one time frame the test data received on each said channel with the test data received on all other said connected channels, and means responsive to said comparing means and effective when test data on a first of said connected channels arrives at said data recovery unit in a time frame subsequent to the time frame during which said test data arrives over another of said connected channels for inserting delay in the transmission of subsequent data over said other channel.

6. The invention defined in claim 5 wherein said test data comprises a series of signals each successive signal being transmitted in a corresponding successive time frame and wherein said transmitting means sends the same signal over all said connected channels during the same time frame.

7. The invention defined in claim 6 wherein said comparing means comprises a memory array having a plurality of memory locations each being associated with a corresponding one of said channels and each location comprising a plurality of memory cells each for storing one of said signals received during an individual time frame.

8. The invention defined in claim 7 wherein said comparing means further comprises means for writing into said cells the test signals received during each successive time frame and means for detecting when the first of said series of test signals has been written in all of said memory locations.

* * * * *